US006164592A

United States Patent [19]

Stephan et al.

[11] Patent Number: 6,164,592
[45] Date of Patent: Dec. 26, 2000

[54] CONTAINER HAVING A DOOR

[75] Inventors: Walter A. Stephan, St.Martin; Hermann Filsegger, Ried im Innkreis, both of Austria

[73] Assignee: Fischer Advanced Composite Components Gesellschaft m.b.H., Reid im Innkreis, Austria

[21] Appl. No.: 09/110,952

[22] Filed: Jul. 7, 1998

[30] Foreign Application Priority Data

| | | | |
|---|---|---|---|
| Jul. 7, 1997 | [AT] | Austria | 1161/97 |
| Apr. 23, 1998 | [AT] | Austria | 686/98 |

[51] Int. Cl.[7] .......... B64D 9/00

[52] U.S. Cl. .......... 244/118.1; 16/278; 220/830

[58] Field of Search .......... 244/118.1, 118.5, 244/117 R, 129.1, 129.4, 129.5; 220/334; 16/278, 308

[56] References Cited

U.S. PATENT DOCUMENTS

| | | | |
|---|---|---|---|
| 300,137 | 6/1884 | Saxe | 220/324 |
| 2,183,210 | 12/1939 | Anderson | 16/278 |
| 3,700,199 | 10/1972 | Matuska | 248/292 |
| 4,829,628 | 5/1989 | Vuksic | 16/308 X |
| 5,441,218 | 8/1995 | Mueller et al. | 244/118.1 |
| 5,465,862 | 11/1995 | Devlin | 16/278 X |
| 5,590,851 | 1/1997 | Ackerman | 244/118.1 |

*Primary Examiner*—Robert P. Swiatek
*Attorney, Agent, or Firm*—Jacobson, Price, Holman & Stern, PLLC

[57] ABSTRACT

In order to provide a container 1 having a door 2, in particular a luggage compartment for aircraft, the door 2 being mounted via at least one hinge or the like on the container 1 such that it can pivot, having an apparatus for assisting the movement of the door 2 into the open position and for holding the door 2 in the open position, and having an apparatus for holding the door 2 in the closed position, in the case of which container the structural components have as small a physical size as possible and thus occupy as little volume in the container 1 as possible. It is provided that the apparatus for assisting the movement of the door 2 and, possibly, an apparatus for damping the movement of the door 2 are arranged essentially around the pivoting axis of the door 2. The components relating to this are ideally integrated in the or each hinge. The damping of the movement of the door 2 advantageously reduces as the opening angle α of the door 2 increases or as the rate at which the door 2 is opened reduces.

9 Claims, 7 Drawing Sheets

CONTAINER HAVING A DOOR

Figure 1A:
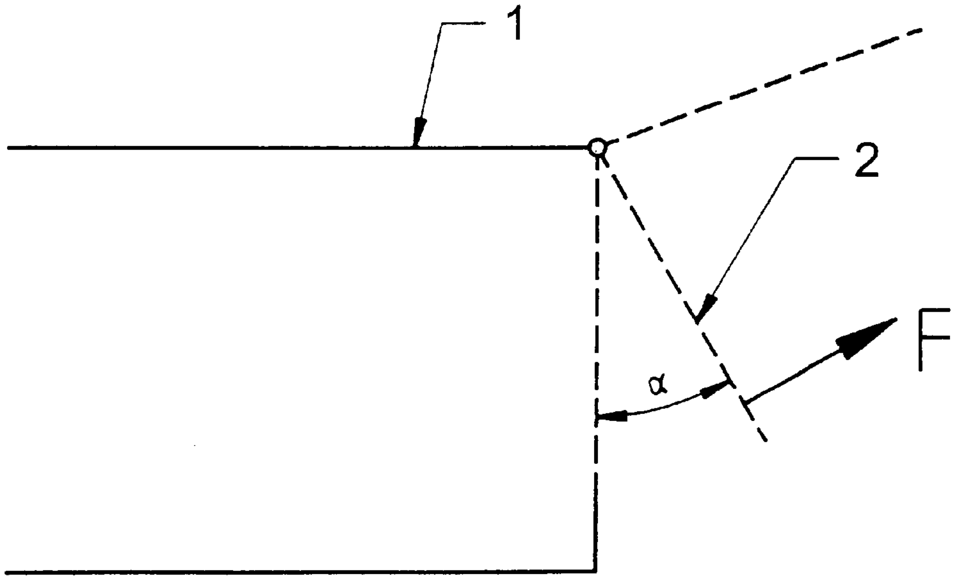

The invention is based on a container having a door, in particular a luggage compartment for aircraft.

Conventional luggage compartments in aircraft are generally equipped with gas springs which make it easier to open the flaps and allow the flaps to be held in the open position. One disadvantage in this case is the temperamental nature of gas springs at low temperatures. If the aircraft is cooled down severely, it is possible as a result of high friction levels for problems to arise when the flaps are being opened. If, for example, the aircraft is parked overnight at an airport, it is possible for the passengers to have difficulties in opening the compartments in the morning. Furthermore, the gas-pressure springs which are arranged on one side or both sides occupy a not inconsiderable part of the existing volume in the luggage compartment, as a result of which the net volume which can be filled with pieces of luggage is reduced. The gas-pressure springs can also be damaged by goods loaded in the compartment, unless covers are fitted, which once again occupies space and exacerbates fitting and maintenance.

The object of the present invention is thus to provide a container having a door, in which container the apparatus for moving the door and for holding the door in its open position has as small a physical size as possible and thus occupies as little volume in the container as possible. The life should be as high as possible, and the production and maintenance costs as low as possible. At the same time, the disadvantages of known systems should as far as possible be avoided, or should at least be reduced. The container according to the invention should also, in particular, satisfy the stringent safety and loading conditions demanded for use in the aircraft industry.

The object according to the invention is achieved in that the apparatus for assisting the movement of the door into the open position and for holding the door in the open position is arranged essentially around the pivoting axis of the door. This construction results in a design which is compact and maintenance-friendly. No components project significantly into the interior of the container, as a result of which, particularly in aircraft, no valuable stowage volume is lost.

In order to ensure that the movement of the door of the container does not take place too sharply and too quickly, while nevertheless ensuring that the door is held in the open position, it is provided that an apparatus for damping the movement of the door is arranged essentially around the pivoting axis of the door and is designed in such a manner that the damping reduces as the opening angle of the door increases. This ensures that, after opening of the apparatus for holding the door in the closed position, the door does not jump open too quickly, while ensuring that the completely open door (maximum opening) is held. The arrangement essentially around the pivoting axis of the door results in the construction remaining compact, and occupying a small stowage volume, even when such a damping apparatus is present.

As an alternative to this, an apparatus for damping the movement of the door is arranged essentially around the pivoting axis of the door and is designed in such a manner that the damping reduces as the rate at which the door is opened reduces. This ensures that, after the door is opened, the movement of the door of the container does not take place too quickly, while nevertheless ensuring that the door is held in the open position. The arrangement essentially around the pivoting axis of the door results in the construction remaining compact, and occupying a small stowage volume, even when such a damping apparatus is present.

The apparatus for damping the movement of the door is advantageously formed by a damping element which moves in a viscous liquid. Such a construction is characterized by particularly low friction losses, as a result of which the life of the arrangement can be further increased. Furthermore, this means that no annoying noises are caused during opening and closing of the container. Liquid grease may be used, for example, as the viscous liquid. In order to achieve good operation at all possible operating temperatures, the viscosity should be as constant as possible in the range from about −15° C. to 55° C.

The apparatus for assisting the movement of the door into the open position and for holding the door in the open position, and/or the apparatus for damping the movement of the door, are advantageously integrated in the or each hinge or the like. This results in a compact and small construction which can be fitted and replaced easily and is easy to maintain.

One design variant of the invention provides that an apparatus for assisting the movement of the door into the open position and holding it in the open position is formed by a helical spring or the like, which is arranged on the pivoting axis of the door and is stressed in compression, devices being provided to convert the force of the helical spring or the like acting in the pivoting axis of the door into a rotary movement of the door. The use of a helical spring represents a very small variant, which can be produced cost-effectively. Furthermore, the construction is limited to a relatively small number of components.

A further feature of the invention envisages that the devices for converting the force of the helical spring or the like into a rotary movement of the door with the amount of damping of the rotary movement of the door being reduced as the opening angle of the door increases, are formed around a sleeve which surrounds the helical spring or the like, and by one end of the helical spring or the like being firmly mounted and the other end of the helical spring being adjacent to a rod which is connected in a rotationally fixed manner to the door and is mounted such that it can move on the pivoting axis of the door, the rod being connected to at least one bolt or the like, and the sleeve having at least one groove which is arranged like a thread, and through which groove the or each bolt projects, as a result of which the compression force on the rod can be converted into a rotation of the rod and of the door which is connected in a rotationally fixed manner to it, and the damping of the rotary movement of the door is adjustable by means of the pitch of the thread-like groove. As a result of these design measures, the force on the pivoting axis of the door, which is caused by the helical spring, is converted into a rotary movement of the door, at the same time taking account of the damping of the movement. The use of a non-metallic material for the sleeve avoids the metallic helical spring coming into contact with any other metallic objects, as a result of which noise could be caused. The bolts or the like which are located on the rod are guided in a so-called slotted link in the groove in the sleeve, as a result of which the rod is forced to carry out a rotary movement. The shape of the groove as well as that of the bolts (sliding blocks) and their material exert influence on the damping of the rotary movement, as a result of which this rotary movement is easily adjustable and can also be matched to the respective requirements.

Devices are advantageously provided for adjusting the prestress of the helical spring. This can be done, for example, by adjusting the fixed end of the helical spring in the direction of the pivoting axis to prestress the spring, as a result of which, for example, it is possible to compensate to a certain extent for any weakening of the spring caused by wear.

According to a further feature of the invention, in the case of the above design variant, the apparatus for damping the movement of the door is formed by a piston which is arranged such that it can move in a chamber filled with viscous liquid and has perforations for the viscous liquid to pass through. This represents a variant for achieving movement damping for linear motion, in which case the damping reduces as the rate of movement reduces. While the piston is stationary, it does not produce any damping of the spring force of the helical spring, as a result of which, when the door is open, the full spring force is available for holding the door in the open position. On the other hand, the viscosity damping efficiently prevents the door from snapping open too quickly.

According to another design variant of the invention, the apparatus for assisting the movement of the door into the open position and for holding the door in the open position is formed by at least one spring clip, torsion spring or the like which is arranged around the pivoting axis of the door. In this case, the spring or the like is stressed in rotation and thus produces a rotary movement of the door directly, as a result of which no devices are necessary for converting any force in the direction of the pivoting axis into a rotary movement of the door.

In this case, according to a further feature of the invention, the apparatus for damping the movement of the door is formed by a rotating piston which is arranged such that it can rotate in a chamber filled with viscous liquid and has damping vanes, the rotating piston being connected in a rotationally fixed manner to one end of the torsion spring or the like.

If, as above, separate apparatuses are required to damp the movement of the door, these, according to the invention, are essentially arranged around the pivoting axis of the door, for reasons of compactness. Damping which reduces as the opening angle of the door increases can in this case be achieved by various measures, such as a type of disk brake with a brake disk that becomes thinner, or an air spring with a restrictor valve, in which case the cross section of the outlet valve increases as the opening angle of the door increases. The required damping characteristic can likewise be achieved by an appropriately shaped body composed on elastic material.

The embodiments described above may be varied as required within the context of the invention. The main feature in this case is to achieve assistance in the movement of the door into the open position and the holding of the door in the open position, in which case the movement of the door is advantageously strongly damped at the start of the opening movement and the damping is reduced as the opening angle of the door increases, so as to ensure that the door is reliably held in the open position. The force on the door resulting from this, which decreases as a function of the opening angle of the door, can be achieved by various combinations of springs or the like.

Figure 1B:
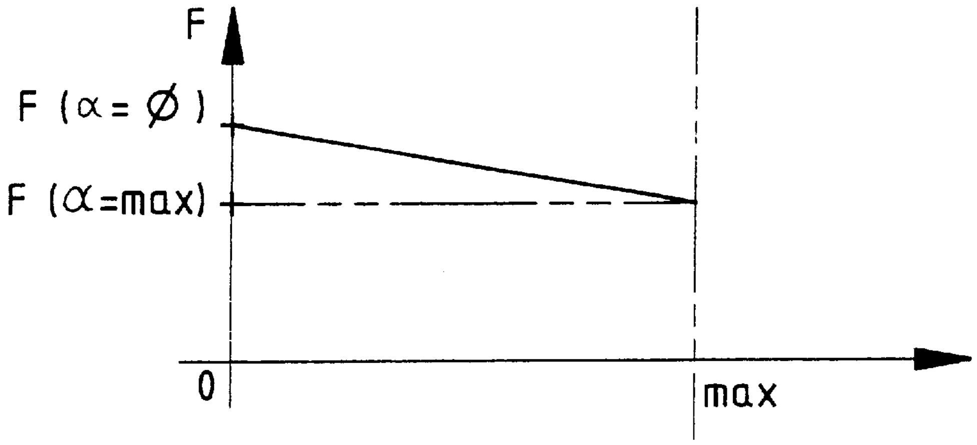
Figure 1C:
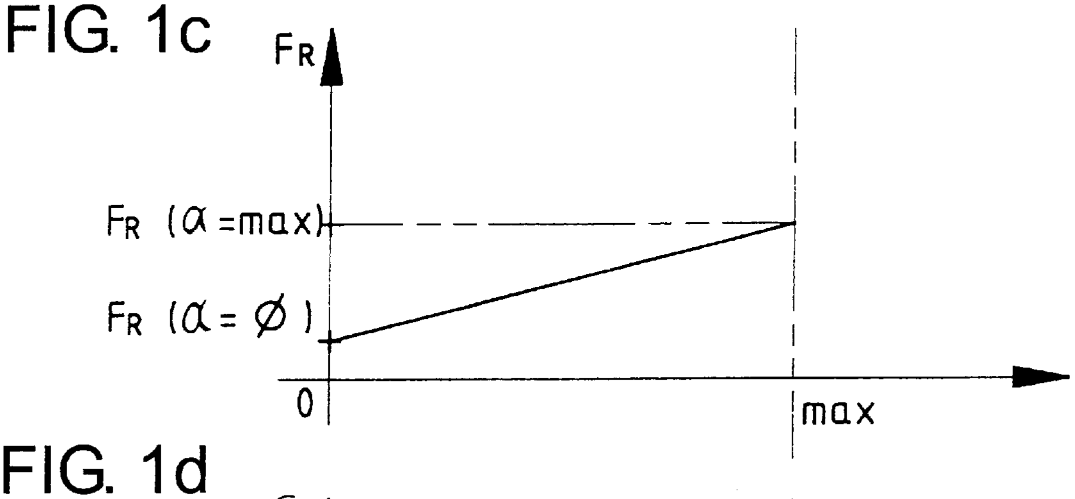
Figure 1D:
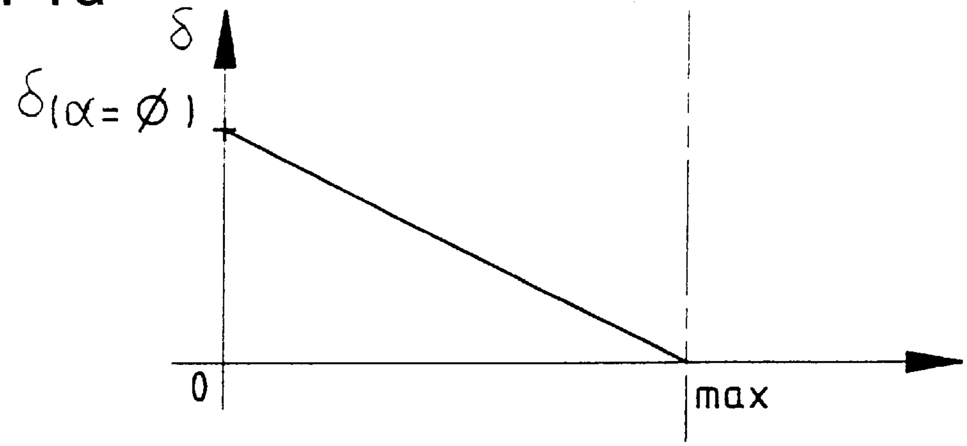

Two exemplary embodiments of the invention are described in more detail with reference to the attached drawings, in which:

FIG. 1*a* shows an outline sketch of a container having a door,

FIGS. 1*b* to 1*d* show the basic profiles of the force F produced by an apparatus for assisting the movement of the door into the open position, the desired resultant force $F_R$ and the damping δ resulting from this, as a function of the opening angle α of the door.

Figure 2C:
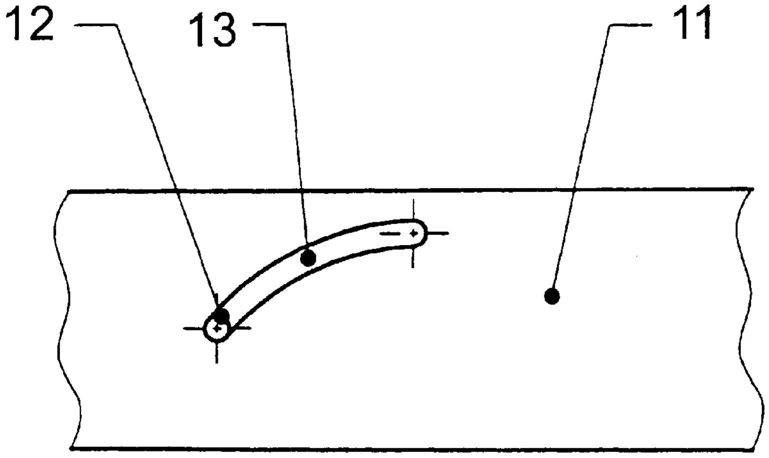
Figure 2A:
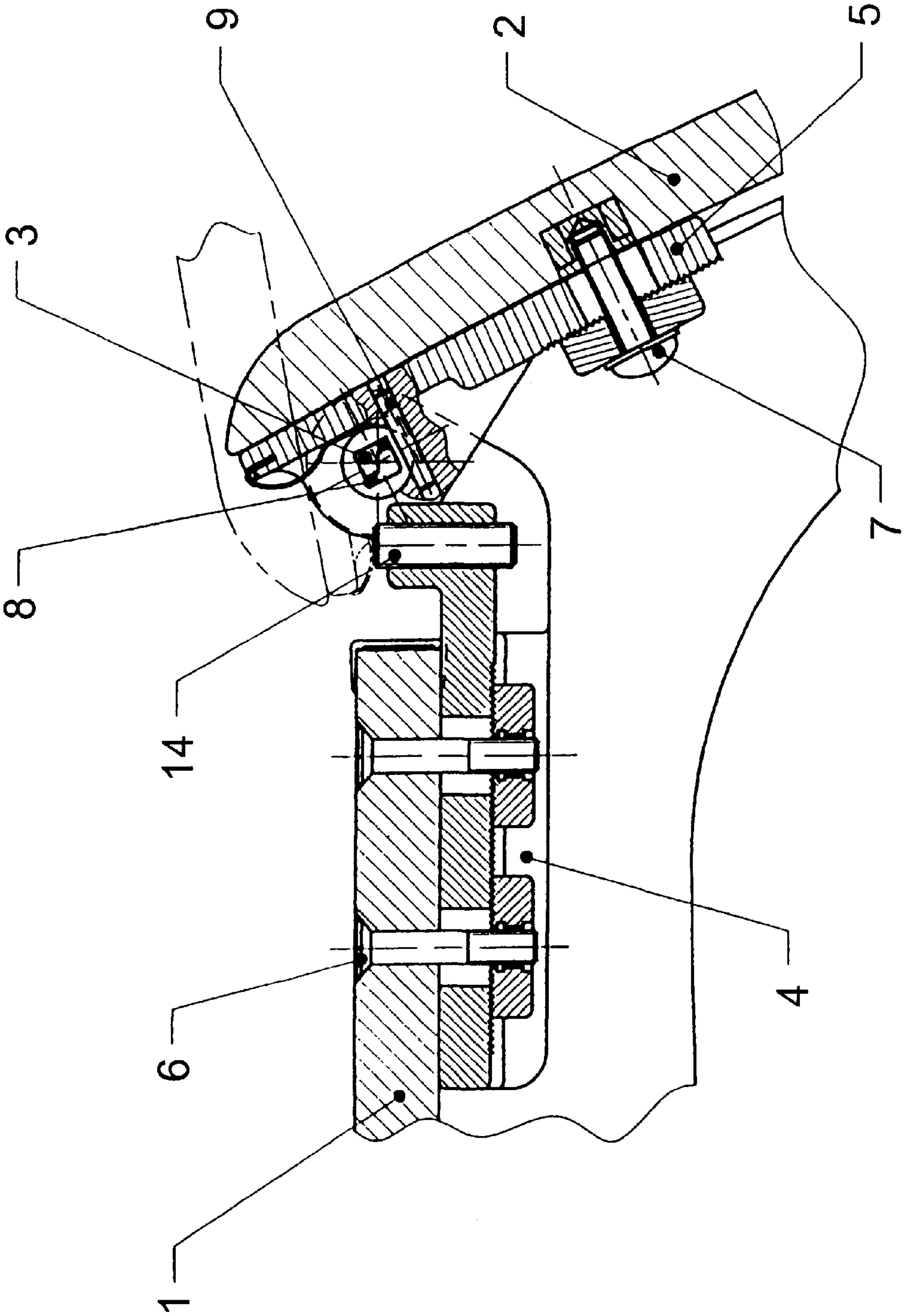

FIG. 2*a* shows a cross section of a design variant of a hinge according to the invention for a luggage compartment for aircraft.

Figure 2B:
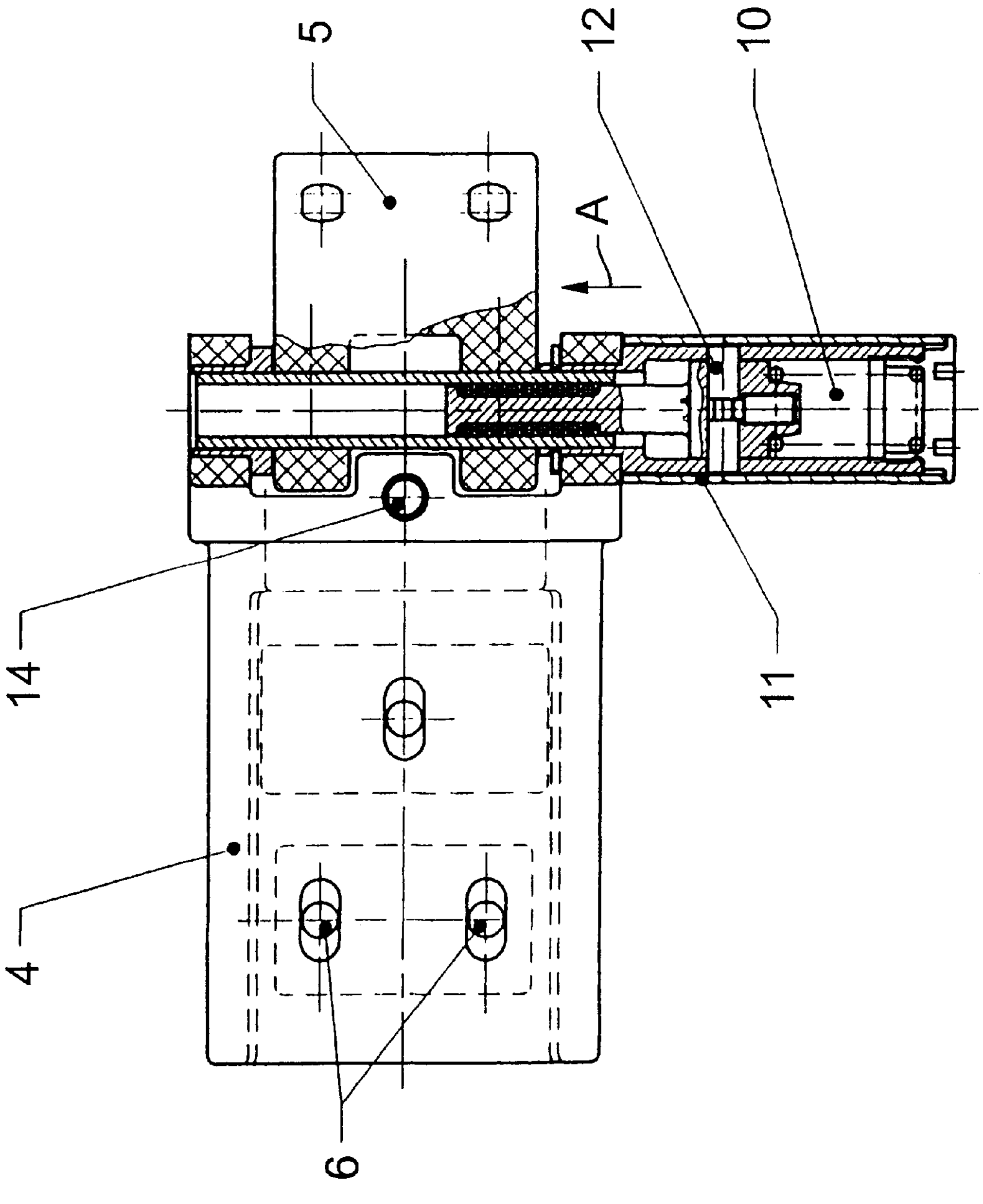

FIG. 2*b* shows a plan view of the design variant of the hinge according to FIG. 2*a,*

Figure 3A:
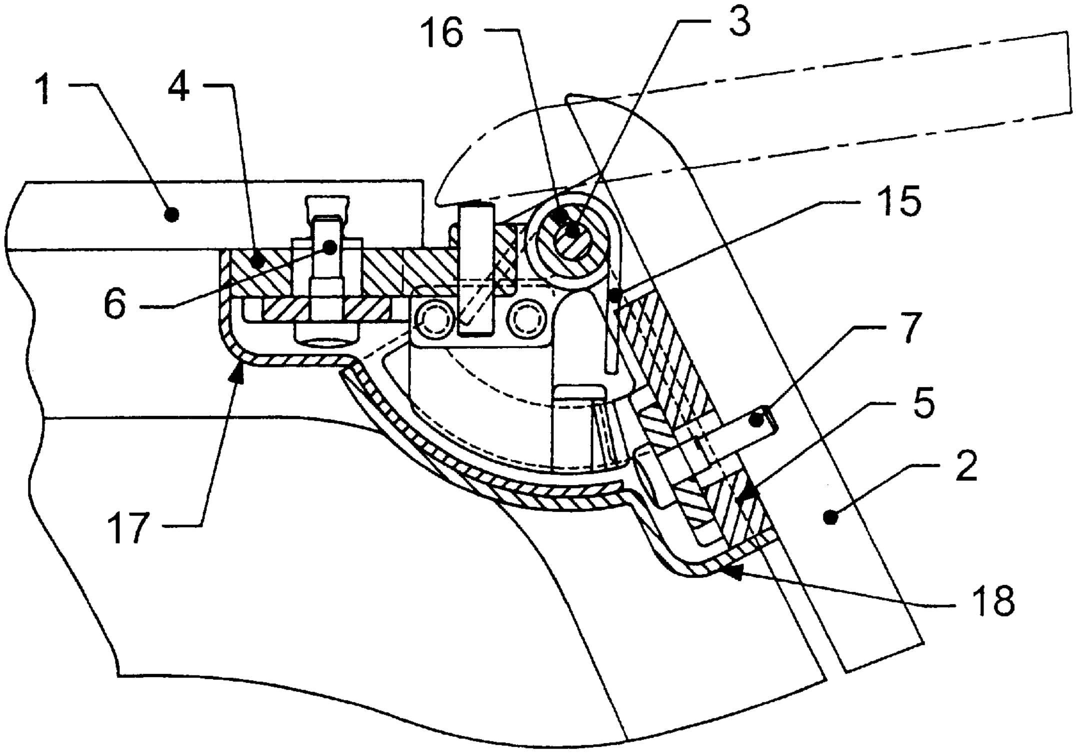
Figure 3B:
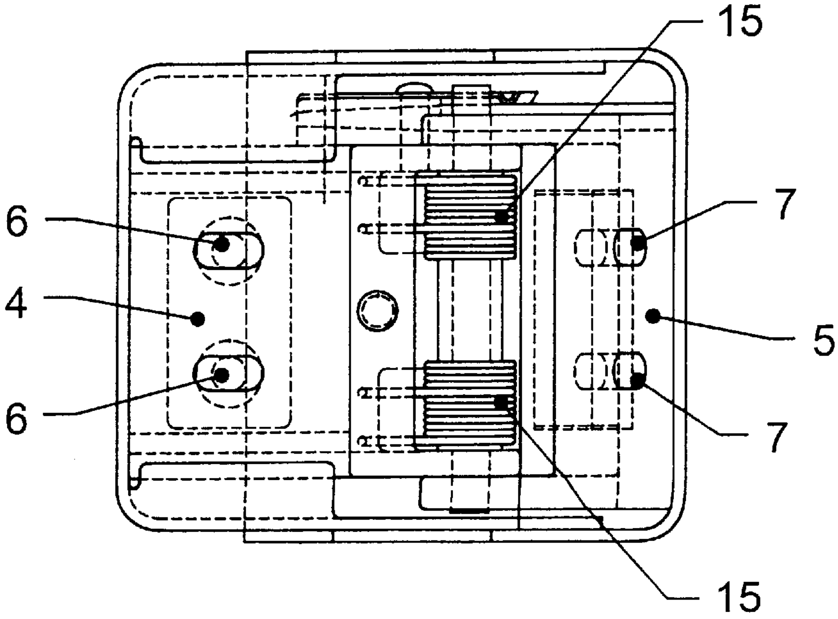

FIG. 2*c* shows a detailed view in order to explain the slotted-link guide,

FIG. 3*a* shows a cross section of another variant of a hinge for a luggage compartment for aircraft, and FIG. 3*b* shows a plan view of the variant according to FIG. 3*a,*

Figure 4A:
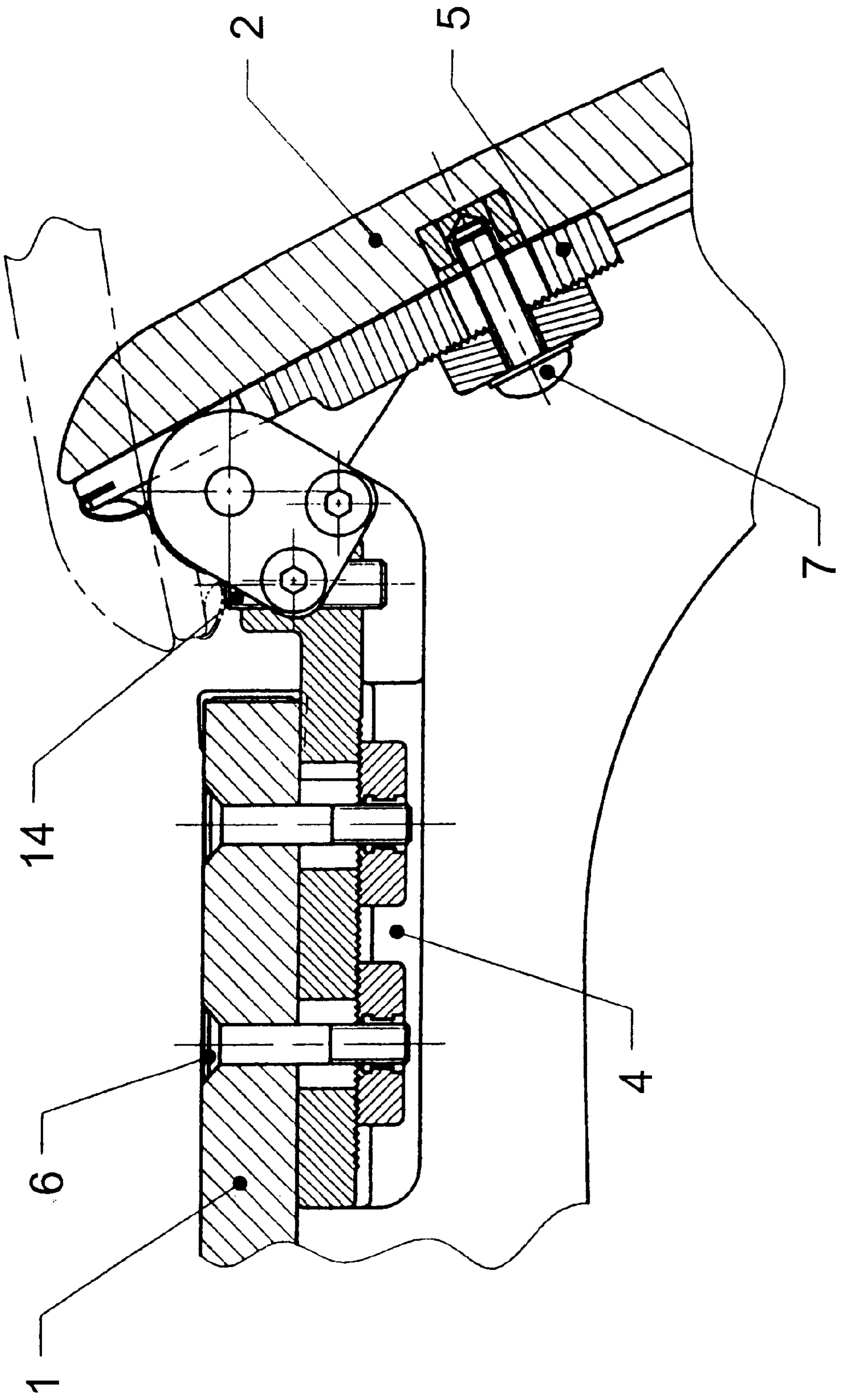
Figure 4B:
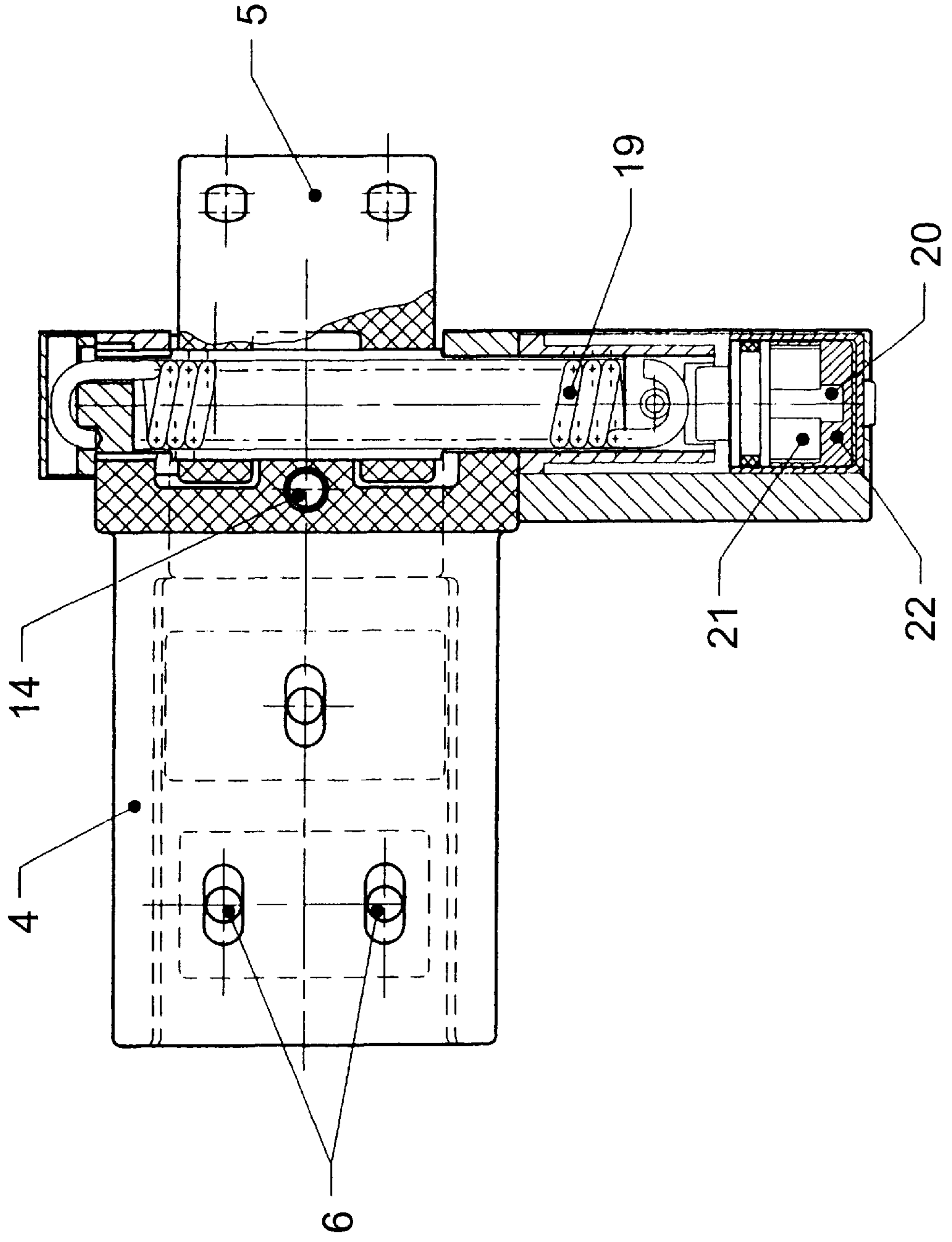

FIG. 4*a* shows a cross section of a design variant of a hinge according to the invention for a luggage compartment for aircraft, FIG. 4*b* shows a plan view of the design variant of the hinge according to FIG. 4*a*.

FIG. 1*a* shows a schematic illustration of a container 1 having a door 2 which is mounted such that it can pivot. The opening angle of the door 2 is denoted by α. A force F is exerted on the door 2, and a torque on the pivoting axis of the door 2, by an appropriate apparatus for assisting the movement of the door 2 into the open position and for holding the door 2 in the open position. As a consequence of the apparatus used to assist the movement of the door 2 into the open position, such as a spring or the like, the force F is normally greatest when the door 2 is closed (that is to say (α=0°), and becomes smaller as the opening angle α increases. This situation is illustrated in the diagram in FIG. 1*b*, which shows the force F as a function of the opening angle α. In practice, this relationship is, of course, not necessarily linear. These diagrams also serve only for understanding. The force F produced by the apparatus for assisting the movement of the door 2 into its open position must be selected such that the door 2 is held in this position when the door 2 is in the open position (that is to say maximum α). The force acting on the door 2 at the maximum opening angle F (α=max) must therefore be greater than the force of gravity acting on the door 2. However, this would produce an unacceptably high force on the door 2 when said door 2 starts to open, which force would result in the door 2 pivoting upward extremely fast, and this could result in people being injured. A profile of the resultant force $F_R$ as a function of the opening angle α is thus desirable which is characterized by a minimum force when the door 2 is closed $F_R$ (α=0) and by maximum force when the door 2 is completely open $F_R$ (α=max), as is illustrated in FIG. 1*c*. Damping δ of the force F is thus required in accordance with the profile shown in FIG. 1*b*, that is to say decreasing damping δ as the opening angle α increases as illustrated in FIG. 1*d.*

FIGS. 2*a* and 2*b* shown a design variant of a hinge according to the invention for a luggage compartment in an aircraft. In this case, a door 2 can be mounted on a luggage compartment at its upper edge, such that it can pivot. The hinge for the pivoting connection of the door 2 to the luggage compartment comprises two bearing plates 4, 5 which are connected via a bolt 3 and of which one bearing plate 4 is connected to the luggage compartment, for example with the aid of screws 6, and the other bearing plate 5 is connected to the door 2, for example with the aid of screws 7, so that the door 2 can be pivoted about the axis of the bolt 3. The bolt 3 is firmly connected to the bearing plate 5, which is itself connected to the door 2.

According to the invention, the bolt 3 is designed with a quadrilateral hole in which a quadrilateral bar 8 is arranged such that movement in the longitudinal direction is possible. An appropriate arrangement of a bolt 9 results in the bearing plate 5 following any rotary movement of the quadrilateral rod 8, without preventing any movement of the quadrilateral rod 8 in the longitudinal direction. Other design variants which provide the same result are, of course, also possible. In order to assist the rotary movement of the door 2, the helical spring 10 in a sleeve 11 is arranged on the axis of the bolt 3 of the hinge, as well as the hinge. The helical spring 10 is firmly anchored at one of its ends, while the other end of the helical spring exerts a compression force in the direction of the arrow A on the end of the quadrilateral rod 8. In order to convert the compression force into a rotary movement of the door 2, bolts 12 or the like are firmly connected to the quadrilateral rod 8, and their outer ends, projecting away from the quadrilateral rod 8, project through a corresponding groove in the sleeve 11. If the apparatus for holding the door 2 in the closed position (not shown), which may be formed by a closure known per se at the free end of the door, is opened, then the helical spring 10 presses the quadrilateral rod 8 in the direction of the arrow A. By designing the groove 13 like a thread (see FIG. 2*c*), the quadrilateral rod 8 is forced to carry out a rotary movement, as a result of which the helical spring 10 causes the door 2 to open. The guidance of the bolt 12 in the sleeve 11 is also referred to as slotted-link guidance, for which reason the bolts 12 are also called sliding blocks. By designing the groove 13 appropriately, it is possible to influence the damping of the rotary movement of the door 2 according to the invention. In order to achieve greater damping at relatively small opening angles α, the pitch of the thread-like groove 13 is thus advantageously designed to be smaller at the start, thus resulting in greater friction and hence, as desired, greater damping. The opening angle α, which is bounded by the groove 13 in the sleeve 11, can also be limited by a spring pressure piece 14. A different design of the groove 13 in the sleeve 11 and choice of the shape and material of the bolts 12 allow a different damping profile to be created, and matching to different characteristics, in a very simple and cost-effective manner. The prestressing of the helical spring 10 can be adjusted by moving the firmly anchored end of said helical spring 10. This could allow weakening of the spring to be overcome to a certain extent, by readjustment.

In the case of the embodiment according to FIGS. 2*a* to 2*c*, both the apparatus for assisting the movement of the door into the open position as well as the apparatus for damping the movement as a function of the opening angle are thus, according to the invention, integrated in the hinge. In consequence, the movement mechanism occupies only a minimal amount of space, and the stowage volume is not reduced by projecting components.

FIGS. 3*a* and 3*b* illustrate a different variant of a hinge for the door 2 of a luggage compartment 1 for air craft. In this case, the force required to assist the movement of the door 2 into the open position is applied by means of at least one spring clip 15. The spring clip 15 is arranged around the bolt 3 of the hinge. In order to avoid any contact between the metallic spring clip 15 and the metallic bolt 3, which could result in annoying noises during opening of the door 2, the bolt 3 is surrounded by a sleeve 16 which is preferably produced from plastic. In the case of this design variant of the hinge, the advantageously necessary apparatus for damping the movement as a function of the opening angle of the door 2 is contained underneath the pivoting axis of the hinge. This apparatus may be designed in a different way. For example, damping is possible using the principle of a disk brake with a disk of reducing thickness. An air spring, having a restrictor valve whose opening cross section becomes larger as the opening angle of the door increases, can also be used to achieve the damping profile described above. In order to protect the damping device as well as the spring against damage and dirt, two covers 17, 18 which can be moved in one another and/or can slide on one another are connected to the luggage compartment 1 and, respectively, to the door 2.

FIGS. 4*a* and 4*b* show a design variant of a hinge according to the invention for a luggage compartment 1 in an aircraft. In this case, a door 2 is mounted on a luggage compartment 1 at its upper edge, such that it can pivot. The hinge for connecting the door 2 to the luggage compartment 1 such that it can pivot comprises two bearing plates 4, 5, of which the one bearing plate 4 is connected to the luggage compartment 1, for example with the aid of screws 6, and the other bearing plate 5 is connected to the door 2, for example with the aid of screws 7. The bearing plate 4 and the bearing plate 5 are connected to one another by a torsion spring 19. One end of the torsion spring 19 is connected in a rotationally fixed manner to a rotating piston 20 having damping vanes 21 which are arranged in a chamber 22 with a viscous liquid, such that they can rotate. When the rotating piston 20 rotates in the chamber 22, the viscous liquid, for example liquid grease, is displaced by the damping vanes 21, and some of the energy stored in the torsion spring 19 is thus converted into displacement work. The damping is in this case independent of the opening angle of the door 2, but is dependent on the rate of opening. The opening angle of the door can be limited by a spring pressure piece 14. When the door 2 is in the open position, the spring force of the torsion spring 19 is not damped, thus ensuring that the door 2 is held securely. One major advantage of viscosity damping is the low-friction, and the low-wear embodiment, as a result of which the life of the hinge can be considerably increased. For example, in the aircraft industry, more than 250,000 opening and closing cycles should be achieved without any significant deterioration in function. In the case of a linear compression force from a helical spring, for example stressed in compression, or of an elastic element, a piston can also be arranged in a chamber filled with viscous liquid, instead of a rotating piston with damping vanes, this piston having perforations or the like through which the viscous liquid passes and thus slows down the movement sequence (not illustrated).

What is claimed is:

1. Container having a door, which door (2) is mounted via at least one hinge on a container (1) such that the door can pivot, the at least one hinge defining a pivoting axis, the container having an apparatus for assisting the movement of the door (2) into an open position and holding the door (2) in the open position, and the container having an apparatus for holding the door (2) in a closed position, wherein the apparatus for assisting the movement of the door (2) into the open position and for holding the door (2) in the open position is arranged essentially around and essentially parallel to the pivoting axis of the door (2), wherein an apparatus for damping the movement of the door (2) is arranged essentially around the pivoting axis of the door (2) and is designed in such a manner that the damping reduces as the rate at which the door (2) is opened reduces.

2. Container according to claim 1, wherein the apparatus for damping the movement of the door (2) is formed by a damping element which moves in a viscous liquid.

3. Container according to claim 1, wherein the apparatus for assisting the movement of the door (2) into the open position and for holding the door (2) in the open position, is integrated in the at least one hinge.

4. Container according to claim 1, wherein the apparatus for assisting the movement of the door (2) into the open position and for holding the door (2) in the open position is formed by a helical spring (10) which is arranged on the pivoting axis of the door (2) and is stressed in compression, and further comprising devices to convert the force coming from the helical spring (10) acting in the pivoting axis of the door (2) into a rotary movement of the door (2).

5. Container according to claim 4, wherein the devices for converting the force coming from the helical spring (10) into a rotary movement of the door (2) with the rotary movement of the door (2) being damped such that the amount of damping is reduced as the opening angle (α) of the door (2) increases are formed in such a way that a sleeve (11) which surrounds the helical spring (10) is arranged such that one end of the helical spring (10) is firmly mounted and the other end of the helical spring (10) is adjacent to a rod (8) which is connected in a rotationally fixed manner to the door (2) and is mounted on the pivoting axis of the door (2) such that it can move, the rod (8) being connected to at least one bolt (12) and the sleeve (11) having at least one groove (13) which is arranged like a thread and through which groove (13) the or each bolt (12) projects, as a result of which the compression force on the rod (8) can be converted into a rotation of the rod (8) and of the door (2) which is connected in a rotationally fixed manner to it, and the damping of the rotary movement of the door (2) can be adjusted by means of the pitch of the thread-like groove (13).

6. Container according to claim 4, wherein devices are provided for adjusting the prestress of a helical spring (10).

7. Container according to claim 4, wherein the apparatus for damping the movement of the door (2) is formed by a piston which is arranged such that it can move in a chamber filled with viscous liquid, and has perforations for the viscous liquid to pass through.

8. Container according to claim 1, wherein the apparatus for damping the movement of the door (2) is formed by a rotating piston (20) which is arranged such that it can rotate in a chamber (22) filled with viscous liquid and has damping vanes (21), the rotating piston (20) being connected in a rotationally fixed manner to one end of the torsion spring (19).

9. Container according to claim 1, wherein the apparatus for damping the movement of the door (2) is integrated in the at least one hinge.

* * * * *